(12) United States Patent
Webber

(10) Patent No.: US 7,900,555 B2
(45) Date of Patent: Mar. 8, 2011

(54) FLYWHEEL FAN FOR SUPPLYING PRESSURIZED AIR FOR CLEANING KNOTTER TABLE

(75) Inventor: Jerry Don Webber, Kahoka, MO (US)

(73) Assignee: Deere & Company, Moline, IL (US)

( * ) Notice: Subject to any disclaimer, the term of this patent is extended or adjusted under 35 U.S.C. 154(b) by 112 days.

(21) Appl. No.: 12/354,307

(22) Filed: Jan. 15, 2009

(65) Prior Publication Data

US 2010/0175359 A1    Jul. 15, 2010

(51) Int. Cl.
  *A01F 15/14*  (2006.01)
  *B30B 9/30*  (2006.01)
(52) U.S. Cl. .......... 100/33 R; 100/102; 56/12.8; 56/343; 56/433; 289/2
(58) Field of Classification Search ................ 100/3, 29, 100/31, 32, 33 R, 102; 56/12.8, 343, 433; 289/2
See application file for complete search history.

(56) References Cited

U.S. PATENT DOCUMENTS

| 3,020,829 | A | * | 2/1962 | Pearson ........................ 100/102 |
| 3,525,302 | A |  | 8/1970 | Eberly et al. |
| 4,805,391 | A | * | 2/1989 | De Zylva ........................ 56/343 |
| 4,951,452 | A | * | 8/1990 | Lundahl et al. ................. 56/341 |
| 7,318,376 | B1 |  | 1/2008 | Baldauf |
| 2007/0175611 | A1 | * | 8/2007 | Roth et al. ....................... 165/95 |

FOREIGN PATENT DOCUMENTS

| DE | 4429066 | 2/1996 |
| GB | 689883 | 4/1953 |

OTHER PUBLICATIONS

European Search Report, Mar. 5, 2010, 4 Pages.

* cited by examiner

*Primary Examiner* — Jimmy T Nguyen

(57) ABSTRACT

A large square baler is equipped with a plunger drive incorporating a flywheel configured as a fan which creates a flow of air within a housing disposed about the flywheel. A duct arrangement is coupled between the housing and a knotter table housing so that air is directed across and maintains a plurality of knotters located at the knotter table free of debris.

4 Claims, 3 Drawing Sheets

FLYWHEEL FAN FOR SUPPLYING PRESSURIZED AIR FOR CLEANING KNOTTER TABLE

FIELD OF THE INVENTION

The present invention relates to the removal of debris from the knotter table of large square balers, and more particularly relates to an onboard fan or blower for creating air flow for such removal of debris.

BACKGROUND OF THE INVENTION

All large square balers on the market today have a dedicated source supplying pressurized air to the knotter table for the purpose of keeping it free from the buildup of debris including hay and straw residue. The buildup of debris on the knotter table causes missed ties, which contributes to poor reliability of the tying function. U.S. Pat. No. 7,318,376 discloses a cross flow blower for blowing air across the knotter table. This blower is driven by a hydraulic motor. Another known baler uses a plurality of electrically driven axial flow fans for either blowing or vacuuming debris from the knotter table.

It is desired then to provide other than a dedicated source for air for the purpose of knotter table cleaning.

SUMMARY OF THE INVENTION

According to the present invention, a large square baler is equipped with a novel device for supplying pressurized air for cleaning the knotter table of debris such as crop residues.

An object of the invention is to incorporate a fan or blower structure in a baler component having another use.

The above object is accomplished by forming a baler drive flywheel as a fan or blower for generating air flow that is routed for cleaning the knotter table. Respective embodiments are provided wherein the flywheel is configured with back curved impeller elements, with forward curved impeller elements or with blades shaped for creating an axial air flow.

The foregoing and other objects will be apparent upon reading the ensuing description together with the appended drawings.

DESCRIPTION OF THE PREFERRED EMBODIMENT

Figure 1:
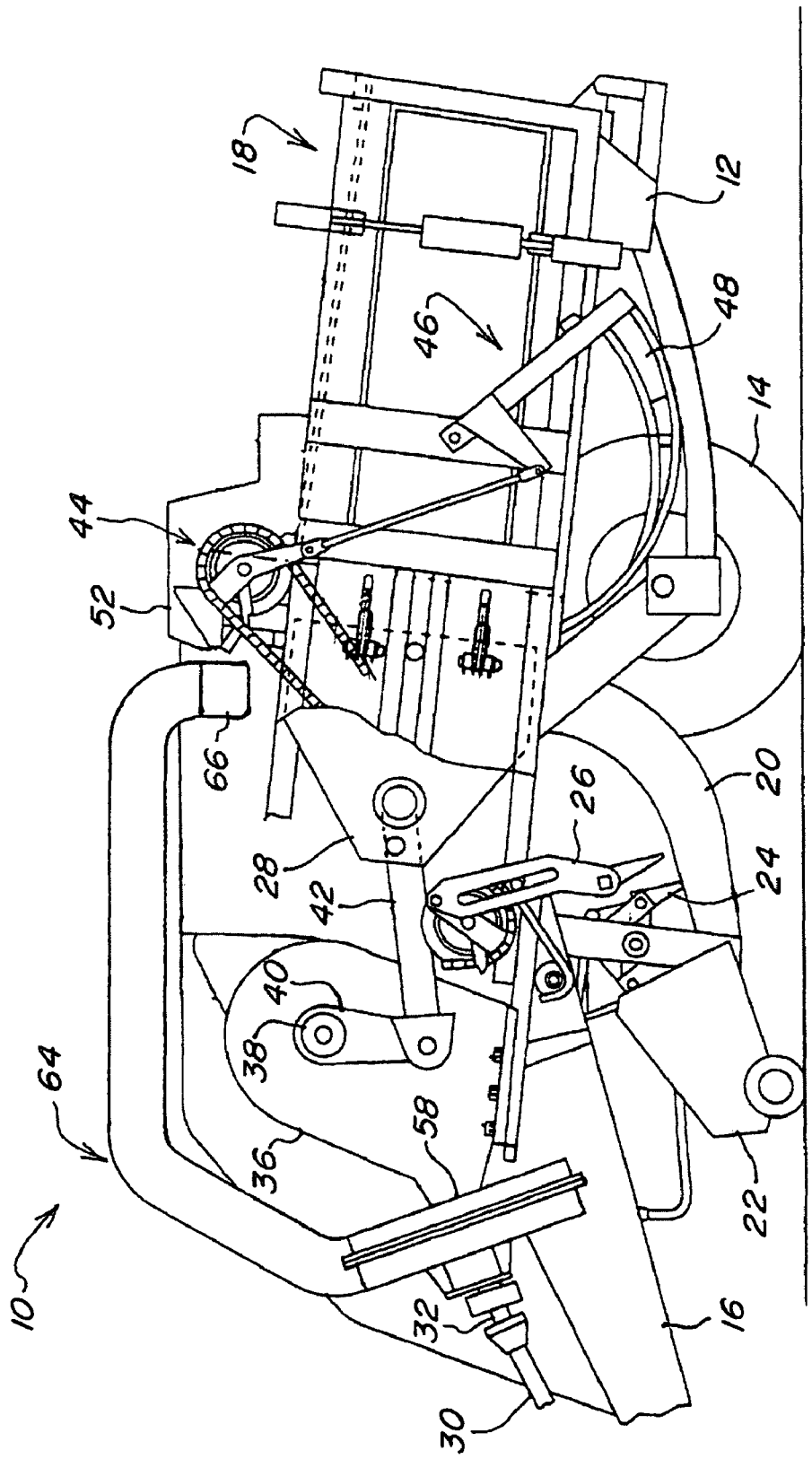
FIG. 1 is a schematic left side view of a large square baler having a drive arrangement incorporating a housed flywheel configured as a centrifugal fan for supplying air for cleaning the knotter table.

Referring now to FIG. 1, there is shown a typical large square baler 10 including a main frame 12 supported on ground wheels 14 and to a forward end of which a tongue 16 is joined, with the tongue being adapted for attachment to a towing vehicle (not shown) such as an agricultural tractor. An elongate, fore-and-aft extending baling chamber 18 is carried by the frame 12 and is provided with a bottom opening, not shown, to which a pre-compression chamber, in the form of a chute 20 which curves upwardly and rearwardly from a forward end located for receiving crop delivered to it by the action of a crop pick-up 22 and a packer fork arrangement 24, with a stuffer fork arrangement 26 being provided for sweeping a charge of pre-compressed crop material from the chute 20 into the baling chamber 18. A plunger 26 is mounted for reciprocating within a forward end region of the baling chamber 18.

Figure 2:
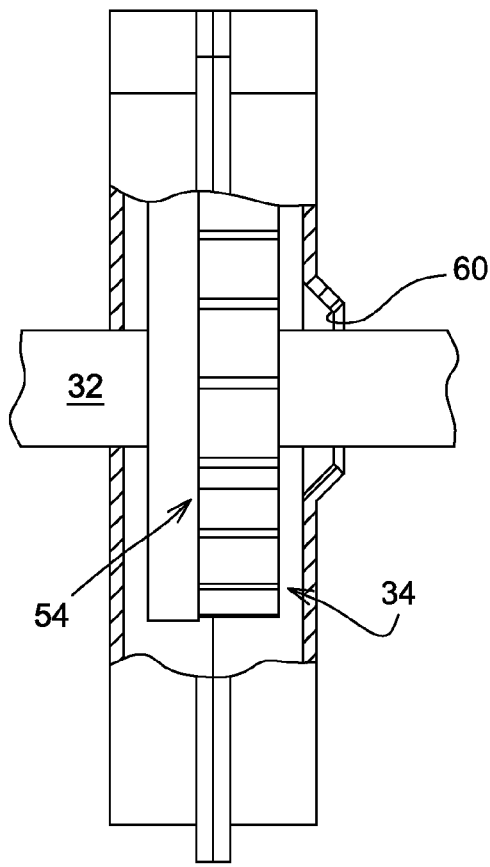
FIG. 2 is an enlarged left side view of the housed flywheel shown in FIG. 1, with a portion of the housing broken away revealing the flywheel, which includes backward curved fins.
Figure 3:
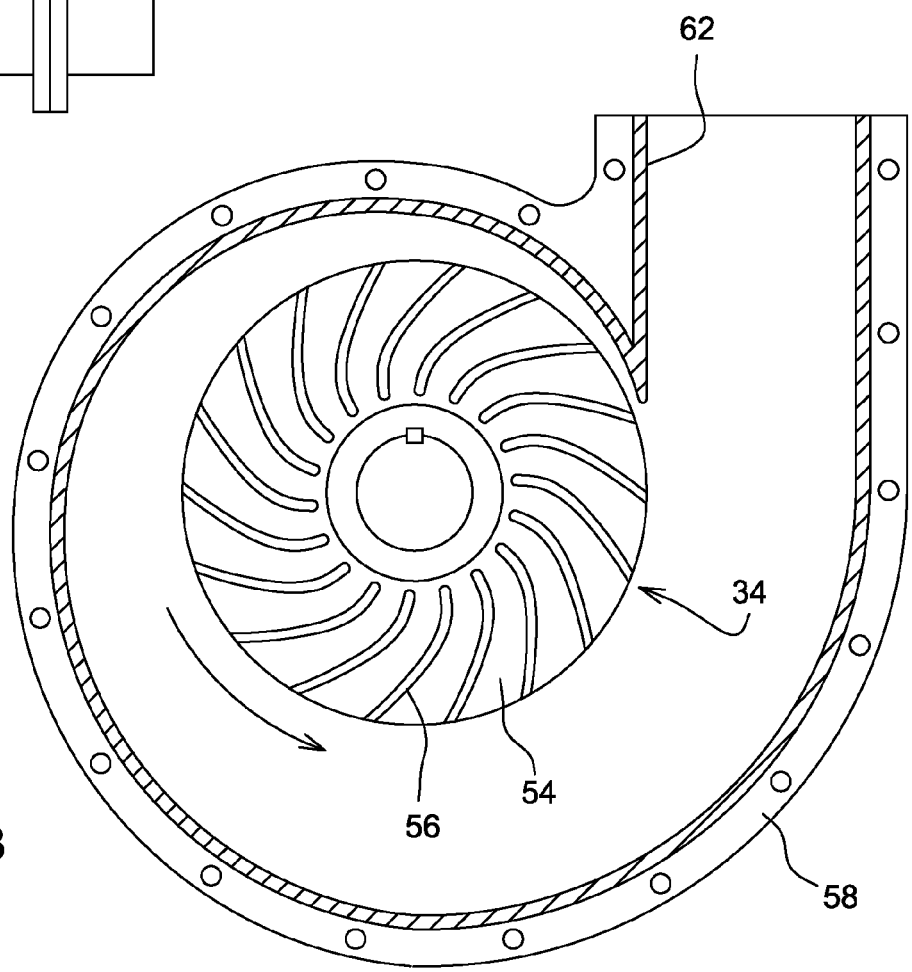
FIG. 3 is a rear view of the housed flywheel shown in FIG. 2, but with a rear section of the housing being removed exposing the backward curved fins.
Figure 4:
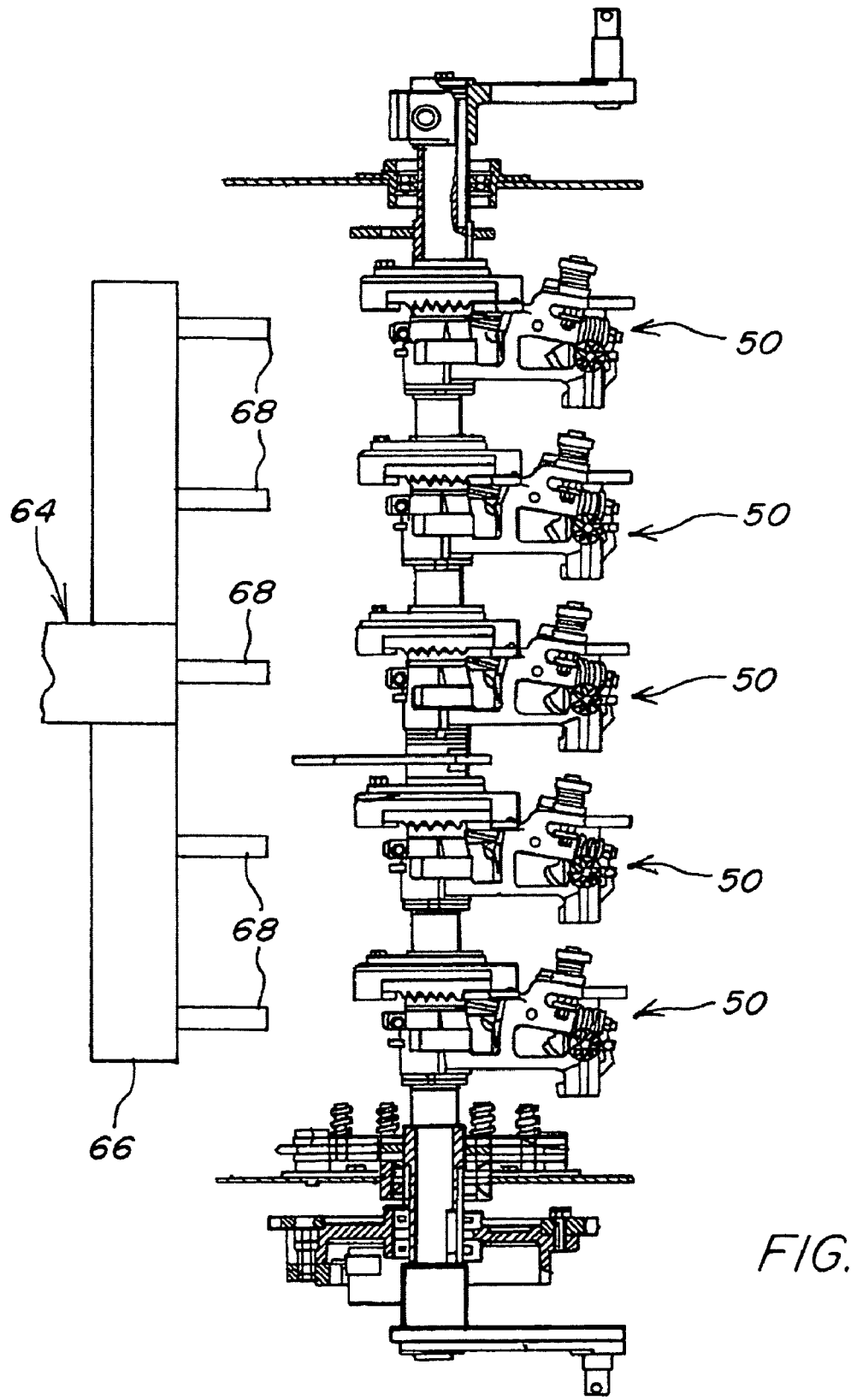
FIG. 4 is a top view of an air delivery manifold defining a rear end portion of the air delivery duct shown in FIG. 1 and shown directing air toward the knotters forming a portion of the knotter table.

The plunger 28 is driven from a drive arrangement including a drive shaft 30 having a forward end coupled to a power take-off shaft (not shown) of the towing tractor. The drive shaft 30 has a rear end coupled to a shaft 32 to which a flywheel 34 (see FIGS. 2 and 3) is fixed for rotation and which has a rear end coupled to an input shaft (not shown) of a transmission located within a gear housing 36, the transmission having an output shaft 38 having opposite end regions projecting outwardly of the housing and having crank arms 40 fixed thereto, with only the left crank arm being shown. Connected between an end of each crank arm 40 and the plunger 28 is a connecting rod 42. Thus, as the output shaft 38 rotates, the rotating motion of the crank arms 40 is transferred by the connecting rods 42 to the plunger 28 so as to cause the plunger to reciprocate and compress charges of crop material received from the chute 20 into the baling chamber 18 so as to form a bale. When the forming bale reaches a preselected length, a bale measuring device (not shown) causes a twine delivery needle drive arrangement 44 to be actuated so as to move a needle yoke 46 including a plurality of transversely spaced needles 48 to swing through the baling chamber and deliver twine to respective knotters 50 (see FIG. 4) of a knotter table located within a housing 52, the knotters acting to tie knots in lengths of twine extending about the formed bale. The number of knotters varies according to the size of the bales, with five knotters 50 being disclosed.

The flywheel 34 has a primary function of evening out the flow of power driving the plunger 28, but in addition is designed as a centrifugal blower fan comprising a circular plate 54 having backward curved fins 56 arranged in a circular array on one side of the plate 54. The flywheel 34 is contained within a scroll-shaped, volute housing 58 provided with an inlet 60 encircling the drive shaft 30 to which the flywheel 34 is fixed. The housing 58 defines an outlet 62 disposed tangentially to the flywheel 34 and being coupled to a duct arrangement 64 that extends rearward to a location at the forward side of the knotter table housing 52, the rear of the duct arrangement being defined by a manifold 66 extending transversely in front of the housing 44 and having transversely spaced nozzles 68 coupled thereto and projecting into the housing 44 in alignment with the transversely spaced knotters 50 contained within the housing.

Thus, it will be appreciated that whenever the flywheel 34 is being driven from the towing tractor power take-off, air will be delivered to the housing 52 so as to blow debris away from the knotters 50 located within the housing and in that way prevent misties which might otherwise happen due to the build-up of debris on the knotters.

While the flywheel 34 is configured as a centrifugal fan having backward curved fins 56 fixed to one side of the plate 54 it is to be understood than any fan configuration would be suitable. For example, the fins 56 could be replaced with forward curved fins, and fins could be fixed to both sides of the plate 54, with an additional air inlet being provided in the volute housing for that side. As a further alternative, the housing could be divided into two separate sections, each having its own inlet and outlet, with the two outlets being coupled to separate ducts that lead back to the knotter table. Also, it is possible to construct the flywheel so as to define an axial flow fan, with duct work being provided for routing this flow to the knotter table.

Having described the preferred embodiment, it will become apparent that various modifications can be made without departing from the scope of the invention as defined in the accompanying claims.

The invention claimed is:

1. In a large square baler including a plunger drive incorporating a flywheel and a knotter table containing a plurality of transversely spaced knotters, the improvement comprising: said flywheel being configured as a fan for creating a flow of air; a housing being associated with said flywheel for receiving said flow of air; and a duct arrangement being coupled to said housing and extending rearwardly to said knotter table and including an outlet arrangement oriented for exhausting air directed to said knotter table so as to inhibit the accumulation of debris on said knotters.

2. The large square baler, as defined in claim 1, wherein said flywheel is configured as a centrifugal fan.

3. In a large square baler including a plunger drive incorporating a flywheel, a knotter table housing containing a plurality of transversely spaced knotters, and a source of pressurized air being coupled to said housing for creating a flow of air passing across said knotters, the improvement comprising: said flywheel being configured as a fan for creating a flow of air; a fan housing being associated with said flywheel for receiving said flow of air; and a duct arrangement coupled between said fan housing and said knotter table housing so as to cause said flow of air passing across said knotters.

4. The large square baler, as defined in claim 3, wherein said flywheel is configured as a centrifugal fan.

* * * * *